Figure 1:
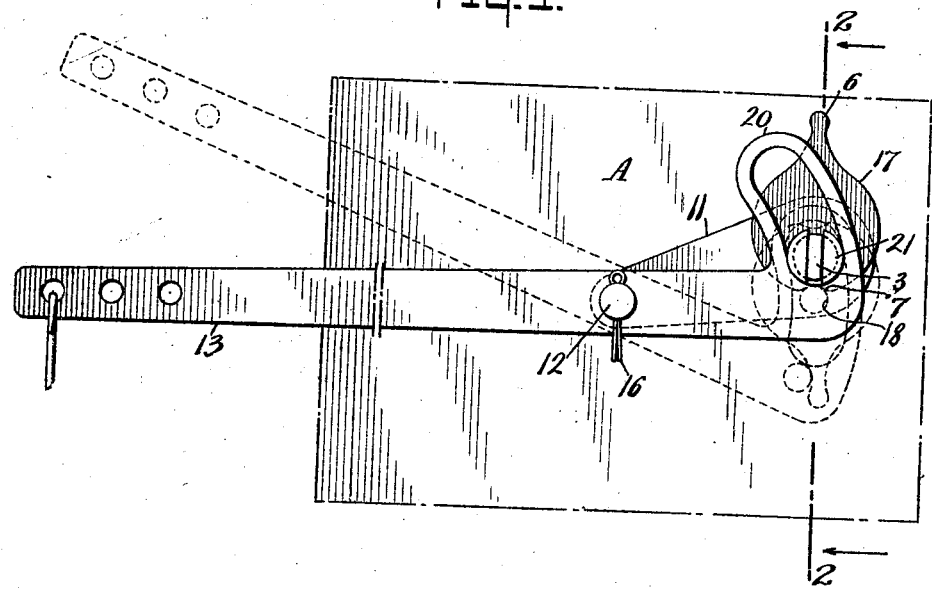

Feb. 3, 1925.

W. H. SCHULTE 1,524,800

FLUSH VALVE OPERATING MECHANISM

Filed April 29, 1922

INVENTOR
William H. Schulte
BY
ATTORNEYS

Patented Feb. 3, 1925.

1,524,800

UNITED STATES PATENT OFFICE.

WILLIAM H. SCHULTE, OF TRENTON, NEW JERSEY.

FLUSH-VALVE-OPERATING MECHANISM.

Application filed April 29, 1922. Serial No. 557,314.

*To all whom it may concern:*

Be it known that I, WILLIAM H. SCHULTE, a citizen of the United States, residing at Trenton, county of Mercer, and State of New Jersey, have invented certain new and useful Improvements in Flush-Valve-Operating Mechanism, fully described and represented in the following specification and the accompanying drawings, forming a part of the same.

This invention relates to improvements in valve operating mechanism, especially to such devices for the control of flush valves.

The especial object of the invention is to provide a simple, cheap and efficient mechanism comprising but a few substantial parts requiring no especial care in manufacture, easily assembled and utilizing no bolts or screws within the tank.

For a full understanding of the invention, a detail description of a flush valve operating mechanism, embodying all the features of the invention in their preferred form, will now be given in connection with the accompanying drawings and the features forming the invention then specifically pointed out in the claims.

In the drawings—

Figure 2:
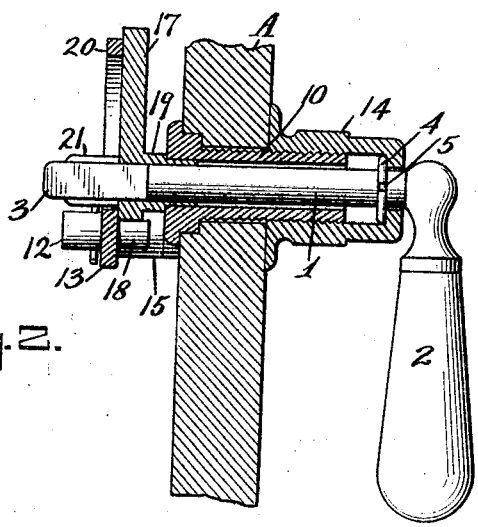

Figure 1 is an elevation of the device as it appears from the inside of the tank, and, Figure 2 is a section on line 2—2 of Figure 1.

Referring to the drawings, the tank wall A is bored as shown in Fig. 2 to receive a sleeve 10 provided at one end with a bracket 11 having an offset fulcrum pin 12, on which is pivoted a valve operating lever 13 and at the other end a screw threaded portion with which nut 14 coacts for binding the bracket 11 against the tank wall A. Lever 13 is preferably provided with a hollow offset portion 15 about the pin 12 for correctly spacing the lever 13 with respect to the bracket 11, the lever 13 being preferably locked on fulcrum pin 12 by a cotter pin 16.

Lever 13 is operated by the engagement of a cam 17 with the short arm thereof, in the present instance by engagement with an offset bearing pin 18, as shown. The cam 17 is supported by a projection or bearing portion 19 which fits within the sleeve 10 and is provided with an enlarged portion bearing against the bracket 11 for correctly spacing the cam 17 therefrom.

The movement of the lever 13 is suitably guided by an arcuately slotted member 20 cast integrally therewith and through which extends a guide stud 21 carried by the cam 17.

The cam is oscillated by a suitable spindle 1 through movement of handle 2, preferably formed integrally therewith. The spindle 1 may be cast integrally with the cam 17 and the handle 2 formed separately therefrom or, as is preferable, the guide stud 21 may be slotted to receive the flattened key portion 3.

The spindle 1 and handle 2 may be removably held in the cap nut 14 by engagement of a spring ring 4 with a recess 5 formed in the spindle 1, as shown.

The cam 17 is provided with a suitable stop 6, at its upper end for limting the movement of the parts and at its lower end with a suitable recess 7 for maintaining the parts in proper position when not in operation.

By movement of the handle 2 to either right or left, the cam 17 is rotated in engagement with the bearing pin 18 thereby raising the lever 13 for opening the flush valve through suitable connections, this movement being limited by the engagement at one side or the other, of the stop 6 with the bearing pin 18, as shown in dotted lines in Fig. 1. Upon release of the handle 2, through the weight of the parts, they again automatically resume their normal position as shown in Fig. 1.

It will be understood that the invention is not to be limited to the specific form shown and described, as modifications may be made therein within the invention as defined by the claims.

What I claim is:

1. In a flush valve operating mechanism the combination with a bracket and means for securing the bracket to the tank wall, of a fulcrum pin on the bracket, a valve operating lever thereon, a cam between the lever and bracket, a support for the cam comprising a projection thereon fitting within the bracket, an offset bearing pin on the lever in engagement with said cam, a single means for holding said parts in position, a spindle passing through the bracket securing means and keyed to the cam, and a handle for operating the spindle.

2. In a flush valve operating mechanism the combination with a bracket and means for securing the bracket to the tank wall, of a fulcrum pin on the bracket, a valve operating lever thereon, a cam between the lever and bracket, an offset bearing pin on the lever in engagement with said cam, means for guiding the lever comprising an arcuately slotted member thereon and a guide stud therein carried by the cam, a spindle passing through the securing means and keyed to the cam, a handle for operating the spindle and means for holding the spindle and handle in position comprising a spring ring engaging a groove in the spindle within said securing means.

3. In a flush valve operating mechanism the combination with bracket 11 and valve operating lever 13 fulcrumed thereon, of bearing pin 18, double cam 17 cooperating with bearing pin 18 for movement of lever 13, stop 6 limiting movement of parts and recess 7 normally maintaining the parts in position, slotted member 20 carried by lever 13, guide stud 21 on cam 17 moving in slotted member 20, spindle 1 keyed in stud 21 and handle 2 secured to spindle 1 for operation thereof.

4. In a flush valve operating mechanism, the combination with a bracket and means for securing the bracket to the tank wall, of a fulcrum pin on the bracket, a valve operating lever thereon, a cam between the lever and the bracket, a support for the cam comprising a projection thereon fitting within the bracket, an offset bearing pin on the lever in engagement with said cam, a spindle passing through the bracket securing means and keyed to the cam in freely removable relation thereto, a handle for operating the spindle, and means within the bracket securing means for holding the spindle and handle in position.

In testimony whereof, I have hereunto set my hand.

WILLIAM H. SCHULTE.